United States Patent

[11] 3,601,341

| [72] | Inventor | Heinrich Hertel<br>Tannenbergallee 36, Berlin, Germany |
|---|---|---|
| [21] | Appl. No. | 779,574 |
| [22] | Filed | Nov. 27, 1968 |
| [45] | Patented | Aug. 24, 1971 |
| [32] | Priority | Nov. 29, 1967 |
| [33] | | Germany |
| [31] | | P 15 31 423.5 |

[54] COMPARTMENTAL FUSELAGE
8 Claims, 8 Drawing Figs.

[52] U.S. Cl. .................................................. 244/119,
244/118, 297/193, 297/232
[51] Int. Cl. ................................................ B64c 1/18
[50] Field of Search........................................... 244/118,
119, 120, 137; 105/345; 296/28.2, 63, 64, 69;
297/232, 193; 114/201; 160/88, 213, 207, 188

[56] References Cited
UNITED STATES PATENTS

| 2,623,720 | 12/1952 | Fortunato...................... | 244/119 |
| 2,690,797 | 10/1954 | Eriksen ......................... | 160/88 |
| 2,743,773 | 5/1956 | Weiertz.......................... | 160/213 |
| 3,028,130 | 4/1962 | Burton .......................... | 244/118 |
| 3,155,348 | 11/1964 | Ricard........................... | 244/119 |

*Primary Examiner*—Milton Buchler
*Assistant Examiner*—Steven W. Weinrich
*Attorney*—Michael S. Striker ABSTRACT: The outer shell of a fuselage is divided by a floor wall into an upper pressurized passenger compartment and a lower compartment in which jet engines and other machinery are located. A service opening is provided in the floor wall and is normally closed by closure means to which seats are secured. When the closure means is open, access from the passenger compartment to the machinery in the lower compartment is possible through the service opening.

Inventor:
HEINRICH HERTEL

By: Michael S. Striker
Attorney

Inventor:
HEINRICH HERTEL

COMPARTMENTAL FUSELAGE

BACKGROUND OF THE INVENTION

In aircraft fuselages according to the prior art, compartments for the passengers and crew are pressurized, and an unpressurized compartment for the propulsion plant is provided under the floor of the pressurized compartments. It is necessary to construct the floor so that an airtight seal is obtained between the unpressurized lower compartment for the machinery, and the pressurized upper compartments. Since the floor does not permit access to the lower compartment from the upper compartment, the lower compartment must be entered from lateral openings, or from below, but due to the fact that the engines are disposed closely spaced from each other and the floor, access to the upper parts of the engine, and to adjacent sides of the engines is difficult.

SUMMARY OF THE INVENTION

It is one object of the invention to provide a compartmental fuselage which permits access to machinery in a lower compartment through a service opening in the floor of an upper compartment.

Another object of the invention is to provide a closure means for closing and opening a service opening in a wall separating a pressurized compartment which is used by crew or passengers, and a lower unpressurized compartment in which machinery, such as the jet engines of a propulsion plant are located.

With these objects in view, an arrangement according to the invention comprises a fuselage having an outer shell, a floor wall dividing the outer shell into an upper compartment for the use by passengers or crew, and a lower compartment for machinery, such as jet engines, and a closure for a service opening in the floor wall which can be opened to permit access to the lower compartment by servicing personnel.

The upper compartment is pressurized, and the lower compartment is unpressurized so that the pressure in the upper compartment presses the closure against the edges of the service opening to provide a seal between the pressurized and unpressurized compartments.

In the preferred embodiment, seats for passengers are fixed to the top face of the closure and move with the same when the closure is opened and closed. The weight of the closure and of the seats thereon urges the closure to the closed position in which an airtight seal is obtained by the higher pressure in the upper compartment.

Since the seats are secured to the closure, it is not necessary to detach the seats before the closure is opened, and the space available for passenger seats is not reduced.

Preferably, the closure has articulated parts. In one embodiment of the invention, a closure plate fitting into the service opening is hingedly connected with support means which are mounted on hinges at one end of the service opening. In another embodiment, two or more panels are articulated to each other and fold during opening and closing of the closure.

It is advantageous to connect supporting legs by elastic joints with a panel of the closure for holding the same in the open position against the action of the force of gravity which urges the closure to close the service opening.

Closures comprising a plurality of articulated panels are particularly suitable for large service openings, and one of the panels may be advantageously used as a support for holding the closure in the open position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
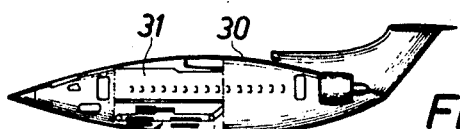
FIG. 1 is a schematic side elevation of an aircraft provided with a compartmental fuselage according to the invention.
Figure 2:
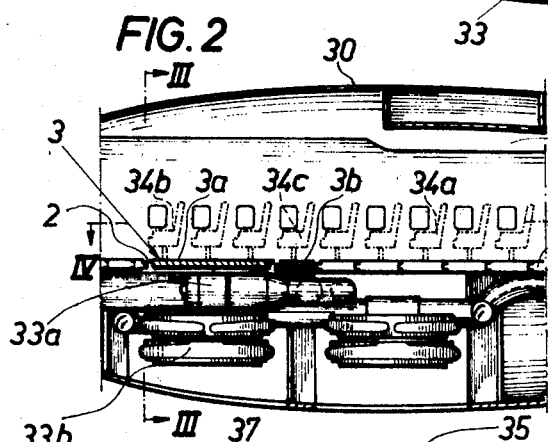
FIG. 2 is a longitudinal vertical sectional view illustrating a section of the fuselage shown in FIG. 1 on a larger scale.

Referring first to FIGS. 1 to 4, the outer shell 30 of a fuselage of an aircraft, is divided by walls including a floor wall 1 into an upper compartment 31 with a ceiling 31a, and a lower compartment 32. Seats 34a, fixed to floor wall 1, are provided in the upper compartment, while the propulsion plant including jet engines 33a and duct means 33b are provided in the lower compartment 32. Since the upper compartment 31 is used by passengers, it is pressurized, while the lower compartment 32 is not pressurized.

Figure 3:
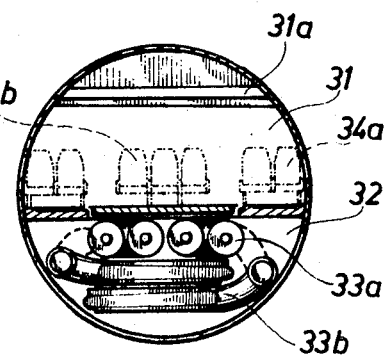
FIG. 3 is a vertical cross-sectional view taken on line III—III in FIG. 2.
Figure 4:
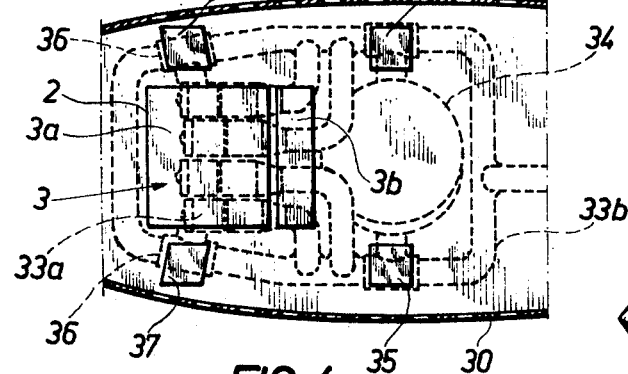
FIG. 4 is a longitudinal horizontal sectional view taken on line IV—IV in FIG. 2.

Floor wall 1 is provided with a rectangular service opening 2 which is normally closed by a closure 3 which in the construction illustrated in FIGS. 1 to 4, includes a first plate 3a hingedly connected to the forward end of service opening 2, and a second narrower plate 3b hingedly connected to the rear end of service opening 2. Seats 34b are secured to the first closure plate 3a, and seats 34c are secured to the second closure plate 3b and move with the same when the closure plates are opened. As best seen in FIG. 3, the seats are arranged in transverse rows, and the width of closure plates 3a and 3b is sufficient for a group of three seats. Nine seats 34b are fixed to closure plate 3a, and three seats 34c are fixed to closure plate 3b.

FIGS. 5 to 8 illustrate specific embodiments of the invention in which service openings 2 in a floor wall 1 are closed and opened by articulated closure means 3. The open position of each closure means is shown in solid lines, and the closed position located at the level of the opening 2 is shown in chain lines.

Figure 5:
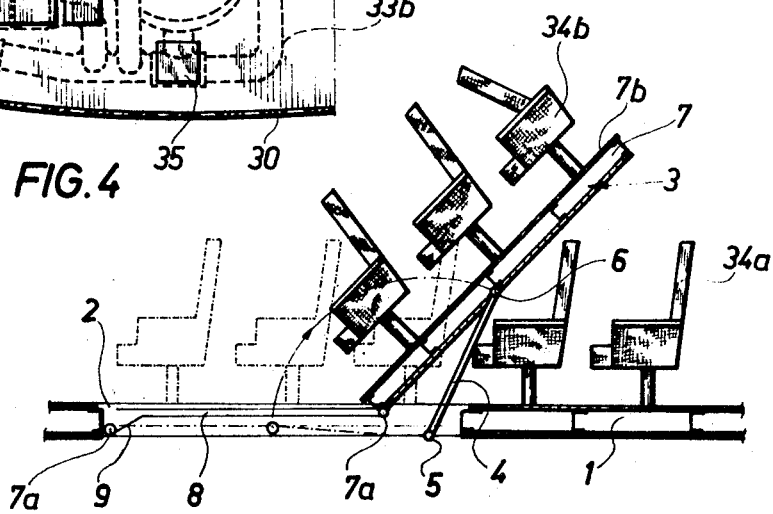
FIG. 5 is a fragmentary schematic side elevation illustrating on an enlarged scale a first embodiment of the invention.

Referring first to the embodiment of FIG. 5, the closure means 3 comprises support means 4 mounted on pivot joints 5 secured to floor wall 1 in the region of the rear end of the rectangular surface opening 2. The upper ends of supports 4 are connected by hinge joints 6 to the bottom face of a rectangular closure member 7 which has rollers or wheels 7a mounted in the region of its forward end and resting on horizontal guide tracks 8 in the lateral edges of opening 2. Each guide track 8 has a recess 9 in the region of the forward edge of opening 2.

In the illustrated open position of closure means 3, the center of gravity of closure plate 7 and seats 34b is located in the rear of pivot joints 5 so that the closure means 3 tends to remain in the open position. When closure means 3 is moved to a position in which its center of gravity is located forwardly of pivot joint 5, rollers 7a roll along guide tracks 8 until they enter recesses 9 so that projecting portions of top plate 7b overlap the edges of service opening 2 and tightly close the same due to the action of the force of gravity, and also due to the pressure prevailing in the pressurized upper compartment 31. If the closure means 3 is too heavy for manual operation, a motor may be provided for turning a shaft secured to support means 4 and mounted in bearings 5 carried by floor wall 1.

Figure 6:
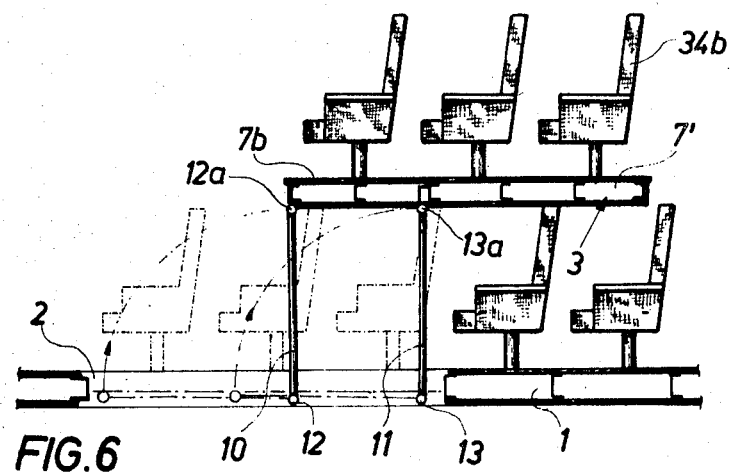
FIG. 6 is a fragmentary side elevation illustrating on an enlarged scale a second embodiment of the invention.

In the embodiment of FIG. 6, closure means 3 has a closure plate 7' fitting into the rectangular service opening 2, and two parallel supports 10 and 11 which are connected by joints 12 and 13 to floor wall 1, and by joints 12a and 13a to the bottom face of closure plate 7'. Assuming that floor wall 1 is horizontal, closure plate 7' and seats 34b fixed thereto remain in a horizontal position during closing of closure means 3, and since the axes of the joints 12 and 13 are located in the region of the bottom face of floor wall 1, the top face 7b of closure plate 7' is flush with the top face of floor wall 1 in the closed position.

Figure 7:
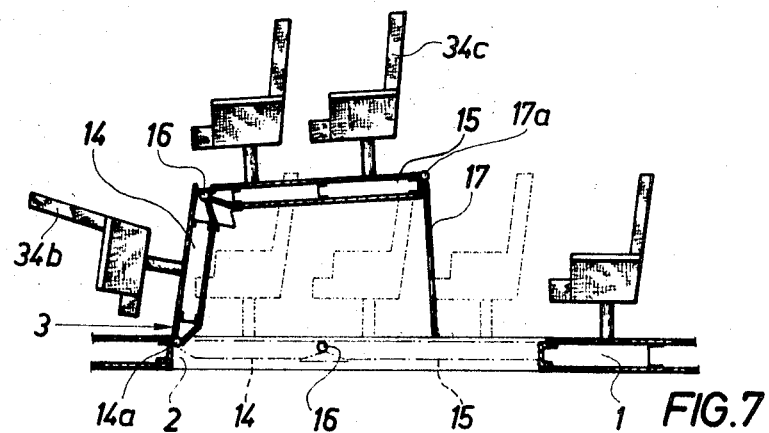
FIG. 7 is a fragmentary side elevation illustrating on an enlarged scale a third embodiment of the invention.

In the embodiment of FIG. 7, closure means 3 has panels 14 and 15 articulated by joints 16. A hinge means 14a supports one end of the panel 14 on floor wall 1 in the region of the forward edge of service opening 2. The articulated panels 14 and 15 carry seats 34b and 34c and can be moved between the closed position shown in chain lines, and the open position shown in solid lines. Since the center of gravity of the closure means and seats is located rearward of joints 14a, the closure means is urged by the force of gravity to move to the closed position in which panels 14 and 15 are located in the horizontal plane of floor wall 1. Supporting leg means 17 are connected by a joint 17a with the rear end of panel 15, and can be placed in the illustrated position resting on floor wall 1 on opposite sides of service opening 2 for holding the closure means 3 in the illustrated open position. When the closure means is to be closed, supporting leg means 17 are either removed, or turned to a position located on top of panel 15.

Figure 8:
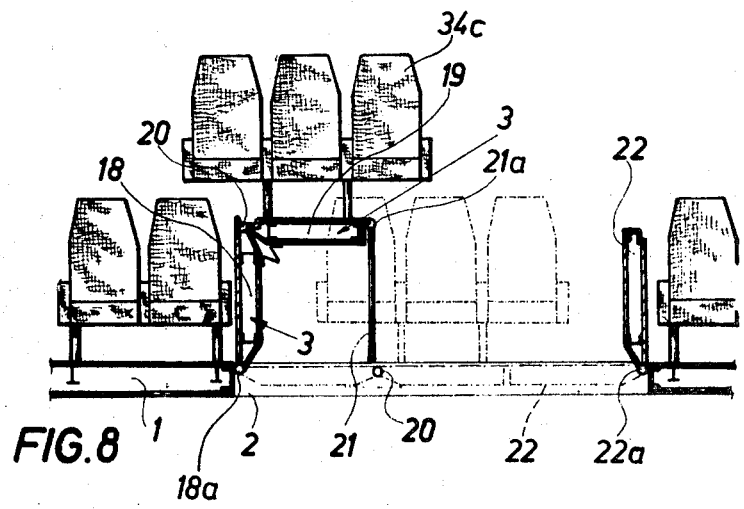
FIG. 8 is a fragmentary cross-sectional view illustrating on an enlarged scale a fourth embodiment of the invention.

The embodiments of FIGS. 1 to 7 have closure means which turn about transverse axes between forwardly and rearwardly located positions in longitudinal direction of the aircraft. The embodiment of FIG. 8 illustrates a construction in which the closure means 3 turn about longitudinal axes and move transverse to the longitudinal direction of the aircraft.

Closure means 3 has two panels 18 and 19 connected by joints 20, and mounted on a pivot joint 18a carried by floor wall 1. Supporting leg means 21 are connected by a joint means 21a to the end of panel 19, and support the same, together with seats 34c, in the open position of the closure means, as described with reference to FIG. 7. The service opening is elongated in transverse direction, and only partly closed by panels 18 and 19. The remaining part of service opening 2 is closed by a third panel 22 which is mounted on a joint means 22a for movement between the illustrated vertical open position, and a closed position located in the service opening 2, as illustrated in chain lines.

It is advantageous to construct joints 17a and 21a as elastic joints with elastic sealing elements. In the embodiment of FIGS. 5 and 6, the closure means 3 tends to remain in the open position, while the closure means of FIGS. 7 and 8 tend to close by the action of the force of gravity. In all embodiments, the closed closure means is more tightly closed, and pressed against the edge of the service opening 2 by the pressure in the pressurized upper compartment. In the preferred embodiments of the invention, the closure means 3 open into the upper compartment so that access for service personnel from the upper passenger compartment is facilitated.

It is a particular advantage of the invention that one mechanic, entering the lower compartment from below through a conventional opening, can cooperate with another mechanic working on the machinery through the opened service opening. However, it is another advantage of the invention that under unfavorable weather conditions, access to the lower compartment is obtained from the interior of the fuselage so that the mechanic does not have to work from the outside of the aircraft. Evidently, during flight the closure means are closed so that the pressurized upper compartment is sealed from the unpressurized lower compartment.

Sealing means, not shown, between closure means 3 and floor wall 1 separate the upper and lower compartments to prevent fumes, noise, and heat produced by the engines in the lower compartment from entering the upper compartment. Service openings, and closure means for the same, as described above, cannot only be provided directly above the engines, but also directly above joints for tiltable lifting blowers 34, as indicated at 35, or directly over connecting sleeves 36 of ducts 33b, as shown at 37 in FIG. 4.

It will be understood that each of the elements described above, or two or more together, may also find a useful application in other types of compartmental fuselages differing from the types described above.

While the invention has been illustrated and described as embodied in a closure means for a service opening between pressurized and unpressurized compartments of a fuselage, it is not intended to be limited to the details shown, since various modifications and structural changes may be made without departing in any way from the spirit of the present invention.

What is claimed as new and desired to be protected by Letters Patent is set forth in the appended claims.

1. Compartmental fuselage comprising, in combination, shell means; floor wall means dividing at least part of the interior of said shell means into an upper compartment for the use by people and a lower compartment for machinery, said floor wall means having a service opening; closure means movable between a closed position closing said opening and an open position for access to said lower compartment by servicing personnel; and comprising a group of seats secured to said closure means for movement with the same, and other seats secured to said floor wall means.

2. Compartmental fuselage as claimed in claim 1 wherein said closure means is substantially horizontal in said closed position and movable in said upper compartment to said open position so that the weight of said closure means urges said closure to tightly close said service opening in said closed position.

3. Compartmental fuselage as claimed in claim 1 wherein said closure means include at least first and second articulated parts, and joint means mounting said first part on said floor wall means for turning movement about a horizontal axis at one end of said service opening.

4. Compartmental fuselage as claimed in claim 3 wherein said first part is a support means having one end connected to said joint means and the other end hingedly connected with the bottom face of said second part, and wherein said second part is a closure member having the same outline as said service opening and fitting into the same in said closed position.

5. Compartmental fuselage as claimed in claim 1 wherein said floor wall means is horizontal; wherein said closure means include two parallel supports, and a closure member having the same outline as said service opening and fitting into the same in said closed position, two joint means for connecting first ends of said supports with said floor wall means, and two joint means for connecting second ends of said supports with the bottom face of said closure member so that said closure member is horizontal in said open and closed positions; said group of seats being fixedly secured to the top face of said closure member.

6. Compartmental fuselage as claimed in claim 1 wherein said closure means includes first and second panels, joint means connecting adjacent ends of said first and second panels, other joint means mounting said first panel on said floor wall means for turning movement with said second panel about a horizontal axis between said open and closed positions, said first and second panels having together the same outline as said service opening and fitting into the same in said closed position; and comprising supporting leg means connected with said second panel for supporting the same on said floor wall means in a substantially horizontal position spaced from said service opening when said closure means is in said open position.

7. Compartmental fuselage as claimed in claim 1 wherein said closure means include at least one closure member for covering said service opening in said closed position, at least one supporting leg means, and joint means connecting said supporting leg means with said closure member, said supporting leg means having a position resting on said floor wall means for supporting said closure member in said open position.

8. Compartmental fuselage as claimed in claim 7 wherein said joint means are elastic.